United States Patent
Kim et al.

(10) Patent No.: US 9,991,623 B2
(45) Date of Patent: Jun. 5, 2018

(54) SEPARABLE CONNECTOR STRUCTURE COUPLED TO DEVICE

(71) Applicant: Samsung Electronics Co., Ltd., Suwon-si, Gyeonggi-do (KR)

(72) Inventors: Yeonwoo Kim, Suwon-si (KR); Jungsik Park, Suwon-si (KR); Seunggil Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/133,695

(22) Filed: Apr. 20, 2016

(65) Prior Publication Data

US 2016/0315410 A1    Oct. 27, 2016

(30) Foreign Application Priority Data

Apr. 22, 2015  (KR) .......... 10-2015-0056774

(51) Int. Cl.
| | |
|---|---|
| H01R 13/73 | (2006.01) |
| H01R 13/74 | (2006.01) |
| H01R 13/506 | (2006.01) |
| H01R 12/72 | (2011.01) |
| H01R 13/6581 | (2011.01) |
| H01R 13/6594 | (2011.01) |
| H04M 1/02 | (2006.01) |
| G06F 1/16 | (2006.01) |
| G06F 1/18 | (2006.01) |

(52) U.S. Cl.
CPC ......... *H01R 13/506* (2013.01); *G06F 1/1656* (2013.01); *G06F 1/181* (2013.01); *H01R 12/722* (2013.01); *H01R 13/6581* (2013.01); *H01R 13/6594* (2013.01); *H01R 13/73* (2013.01); *H01R 13/74* (2013.01); *H04M 1/0274* (2013.01)

(58) Field of Classification Search
CPC .. H01R 13/506; H01R 13/73; H01R 13/6581; H01R 13/6594; H01R 13/74
USPC ..... 439/701, 607.4, 906, 76.1; 361/730, 737
See application file for complete search history.

(56) References Cited

U.S. PATENT DOCUMENTS

| | | | | |
|---|---|---|---|---|
| 4,368,819 A | * | 1/1983 | Durham | B65D 81/3823 206/544 |
| 5,281,169 A | * | 1/1994 | Kiat | H01R 12/712 439/607.35 |
| 5,495,399 A | * | 2/1996 | Gore | H05K 9/0032 174/354 |
| 5,718,605 A | * | 2/1998 | Morikawa | H01R 12/7047 439/607.27 |

(Continued)

FOREIGN PATENT DOCUMENTS

| | | |
|---|---|---|
| CN | 201029144 Y | 2/2008 |
| CN | 203521772 U | 4/2014 |

(Continued)

OTHER PUBLICATIONS

Tsunemoto Watanabe, CN 201029144 Translation.*

*Primary Examiner* — Michael A Lyons
*Assistant Examiner* — Milagros Jeancharles
(74) *Attorney, Agent, or Firm* — Jefferson IP Law, LLP

(57) ABSTRACT

A connector formed with at least two housings is provided. The connector includes a first connector case, and a second connector case, wherein at least one of the first connector case or the second connector case is coupled to an external device to form an integrated structure.

16 Claims, 17 Drawing Sheets

(56) References Cited

U.S. PATENT DOCUMENTS

| | | | | |
|---|---|---|---|---|
| 5,913,698 A * | 6/1999 | Keng | ............... | H01R 13/65802 439/607.17 |
| 6,217,378 B1 * | 4/2001 | Wu | .................... | H01R 23/6873 439/567 |
| 6,654,464 B2 * | 11/2003 | Roussy | .............. | H01R 13/6608 379/433.03 |
| 6,764,339 B2 * | 7/2004 | Kubo | ............... | H01R 13/65802 439/607.24 |
| 7,484,996 B2 * | 2/2009 | Ju | ......................... | H01R 24/58 439/541.5 |
| 7,510,407 B1 | 3/2009 | Blasko et al. | | |
| 7,549,896 B2 * | 6/2009 | Zhang | ................. | H01R 12/707 439/607.01 |
| 8,182,290 B2 * | 5/2012 | Fonteneau | ........... | H05K 9/0058 439/607.21 |
| 8,282,417 B2 * | 10/2012 | Xiao | .................... | H01R 13/648 439/607.36 |
| 9,295,175 B2 * | 3/2016 | Ichikawa | ............. | H05K 5/063 |
| 2005/0037674 A1 * | 2/2005 | Shimizu | ............. | H01R 13/6658 439/731 |
| 2006/0092602 A1 * | 5/2006 | Hou | ...................... | G06F 1/1632 361/679.56 |
| 2013/0058372 A1 * | 3/2013 | Emami | ............. | H01L 21/67109 373/117 |
| 2013/0072040 A1 * | 3/2013 | Ohhashi | ............. | H01R 13/5202 439/76.1 |
| 2013/0106352 A1 * | 5/2013 | Nagamine | ............. | H02J 7/0042 320/113 |
| 2014/0065877 A1 * | 3/2014 | Ohhashi | ............... | H05K 5/0052 439/519 |
| 2014/0134859 A1 | 5/2014 | Lee et al. | | |
| 2014/0187094 A1 | 7/2014 | Zhao et al. | | |
| 2014/0273617 A1 * | 9/2014 | Cheong | ............. | H01R 13/5213 439/521 |
| 2014/0285985 A1 | 9/2014 | Tanaka et al. | | |

FOREIGN PATENT DOCUMENTS

| | | |
|---|---|---|
| CN | 103811889 A | 5/2014 |
| KR | 200448278 Y1 | 3/2010 |

* cited by examiner

SEPARABLE CONNECTOR STRUCTURE COUPLED TO DEVICE

CROSS-REFERENCE TO RELATED APPLICATION(S)

This application claims the benefit under 35 U.S.C. § 119(a) of a Korean patent application filed on Apr. 22, 2015 in the Korean Intellectual Property Office and assigned Serial number 10-2015-0056774, the entire disclosure of which is hereby incorporated by reference.

TECHNICAL FIELD

The present disclosure relates to a connector structure formed with at least two housings. More particularly, the present disclosure relates to a connector structure in which a portion of a separable connector may be coupled to an external device thereof.

BACKGROUND

Electronic devices, such as a mobile terminal, may include various connectors for data transmission and reception and battery charge. For example, an electronic device may perform various functions using various connectors, such as an input/output (I/O) connector, an earjack, a universal serial bus (USB), a high definition multimedia interface (HDMI), a mobile high-definition link (MHL), and the like.

In order to mount a connector in an electronic device, such as a mobile terminal, different kinds of various components should be overlapped. Specifically, because the connector may be damaged by a cable connected from the outside, by adding mechanical devices, such as a separate bracket, a screw, an sus, and a rear fixing portion, the connector may be strongly fixed. For example, the connector may be overlapped in several structures using a connector pin, a connector case, a connector fixing sus, a connector surface mount device (SMD) board, a connector fixing bracket, a connector fixing screw, a rear case, a battery cover case, and the like. Therefore, in addition to a thickness of a basic connector structure, an entire thickness thereof may increase because of an additional reinforcement structure. As a result, it may be difficult to reduce a thickness of an electronic device, such as a mobile terminal in order to obtain a slim design.

Therefore, a need exists for a connector structure in which a portion of a separable connector may be coupled to an external device thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a connector structure in which a portion of a separable connector may be coupled to an external device thereof.

In accordance with an aspect of the present disclosure, a connector formed with at least two housings is provided. The connector includes a first connector case, and a second connector case, wherein at least one of the first connector case or the second connector case is coupled to an external device to form an integrated structure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
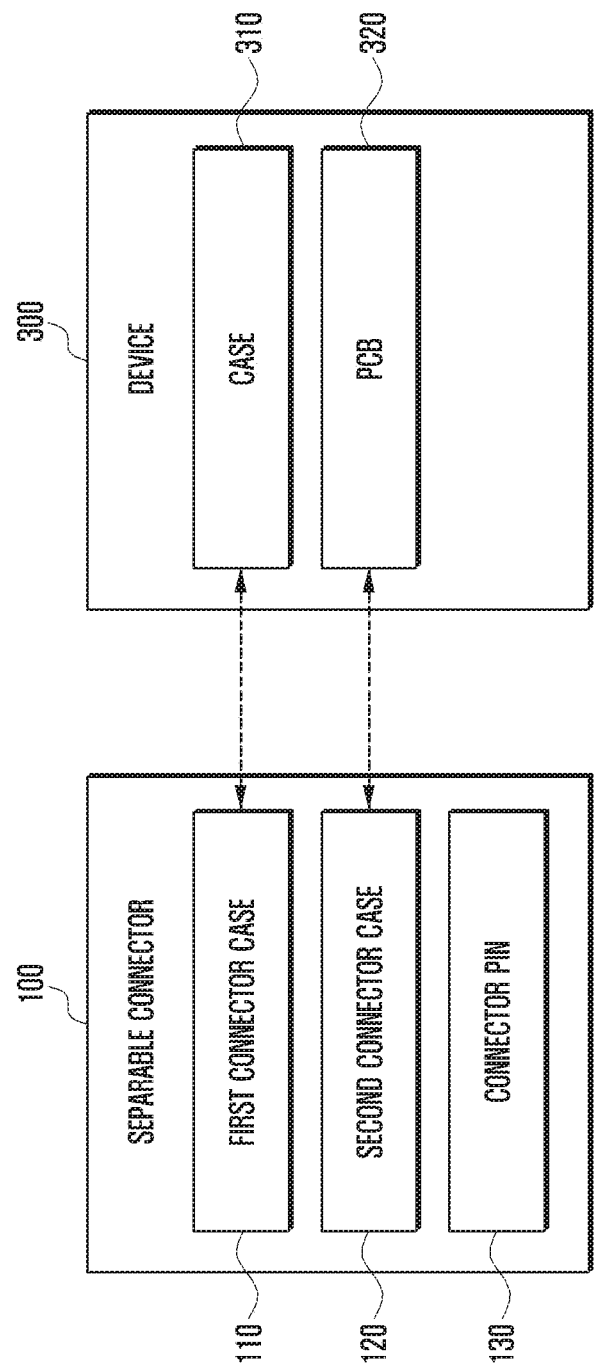
FIG. 1 is a block diagram illustrating a configuration of a separable connector according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, operation, element, component, or combination thereof described in a specification and does not exclude presence or addition of at least one other characteristic, numeral, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In embodiments of the present disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a portable medical device, a digital camera, or a wearable device (e.g., a head-mounted device (HMD), such as electronic glasses, electronic clothes, an electronic bracelet, an electronic necklace, an electronic appcessory, a smart watch, and the like).

According to various embodiments of the present disclosure, an electronic device may be a smart home appliance that involves a communication function. For example, an electronic device may be a television (TV), a digital versatile disc (DVD) player, an audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, and the like), a game console, an electronic dictionary, an electronic key, a camcorder, an electronic picture frame, and the like.

According to various embodiments of the present disclosure, an electronic device may be a medical device (e.g., magnetic resonance angiography (MRA), magnetic resonance imaging (MRI), computed tomography (CT), ultrasonography, and the like), a navigation device, a global positioning system (GPS) receiver, an event data recorder (EDR), a flight DR (FDR), a car infotainment device, an electronic equipment for ship (e.g., a marine navigation system, a gyrocompass, and the like), avionics, a security equipment, or an industrial or home robot.

According to various embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, and the like). An electronic device disclosed herein may be one of the above-mentioned devices or any combination thereof. As well understood by those skilled in the art, the above-mentioned electronic devices are not limited to the aforementioned devices, and may include a new electronic device according to the development of technology.

Hereinafter, an electronic device according to various embodiments will be described with reference to the accompanying drawings. The term 'user' to be used herein may refer to a person or machine (e.g., an artificial intelligence apparatus or system) using an electronic device.

FIG. 1 is a block diagram illustrating a configuration of a separable connector according to various embodiments of the present disclosure.

Referring to FIG. 1, according to various embodiments of the present disclosure, a separable connector 100 may include a first connector case 110, a second connector case 120, and a connector pin 130.

According to various embodiments of the present disclosure, an external appearance of the separable connector 100 (e.g., earjack, universal serial bus (USB), high definition multimedia interface (HDMI), mobile high-definition link (MHL), and the like) may have a form of a housing in which the first connector case 110 and the second connector case 120 are coupled. Further, the inside of the separable connector 100 may be filled with the connector pins 130. For example, the first connector case 110 and the second connector case 120 become a housing of the separable connector 100 to form an internal space of the separable connector 100, and the connector pins 130 may be located at the internal space.

According to various embodiments of the present disclosure, a portion of the separable connector 100 may have an integrated structure coupled to a device 300. For example, the device 300 may include a case 310 and a printed circuit board (PCB) 320. More particularly, the case 310 may include a rear case or a battery case. Here, the rear case may cover at least one component mounted on a PCB of an electronic device, such as a mobile terminal. Further, the battery case may be a case that covers a rear case and a battery and is exposed to the outside to form an external appearance of the mobile terminal.

According to various embodiments of the present disclosure, the first connector case 110 is coupled to the case 310 to form an integrated structure. For example, the first connector case 110 and the case 310 forming an external appearance of the separable connector 100 are coupled to form an integrated structure. In addition to a thickness of a basic connector structure, an entire thickness thereof may increase because of an additional reinforcement structure (e.g., an sus bracket, a rear bracket, and the like) for strongly coupling the separable connector 100.

According to various embodiments of the present disclosure, as a portion of the separable connector 100 strongly couples to the case 310, some of reinforcement structures (e.g., an sus bracket, a rear bracket, and the like) may be reduced. Thereby, an entire thickness of an electronic device, such as a mobile terminal, can be reduced and a production company can produce a product having a slimmer form.

According to various embodiments of the present disclosure, the second connector case 120 is coupled to the PCB 320 to form an integrated structure. For example, the second connector case 120 and the PCB 320 forming an external appearance of the separable connector 100 are coupled to form an integrated structure. For example, a portion of the second connector case 120 may be mounted on the PCB 320 and thus the separable connector 100 and the electronic device may be strongly coupled.

According to various embodiments of the present disclosure, the connector pin 130 is coupled to the external cable to perform a data transmission and reception function. To more stably perform data transmission and reception, the connector pin 130 may include a structure (e.g., protrusions and depressions, a hole, a latch, and the like) for binding the external cable.

According to various embodiments of the present disclosure, the connector pin 130 may include a structure (e.g., protrusions and depressions, a hole, a latch, and the like) for coupling to the first connector case 110 and the second connector case 120. Thereby, the connector pin 130 is fixed to the inside of the separable connector 100 to be protected from an external impact.

According to various embodiments of the present disclosure, the connector pin 130 may include a connector line including a rotation shaft or a flexible cable for transferring an electrical signal for a data input and output. The flexible cable or the connector line may be mounted on the PCB by soldering and may be used for data transmission and reception between the external cable and the electronic device. For example, even if the housing of the connector is broken, the connector pin 130 may stably perform a function (e.g., a data transmission, a charge, and the like) of the electronic device using the connector line including the rotation shaft or the flexible cable.

Figure 2:
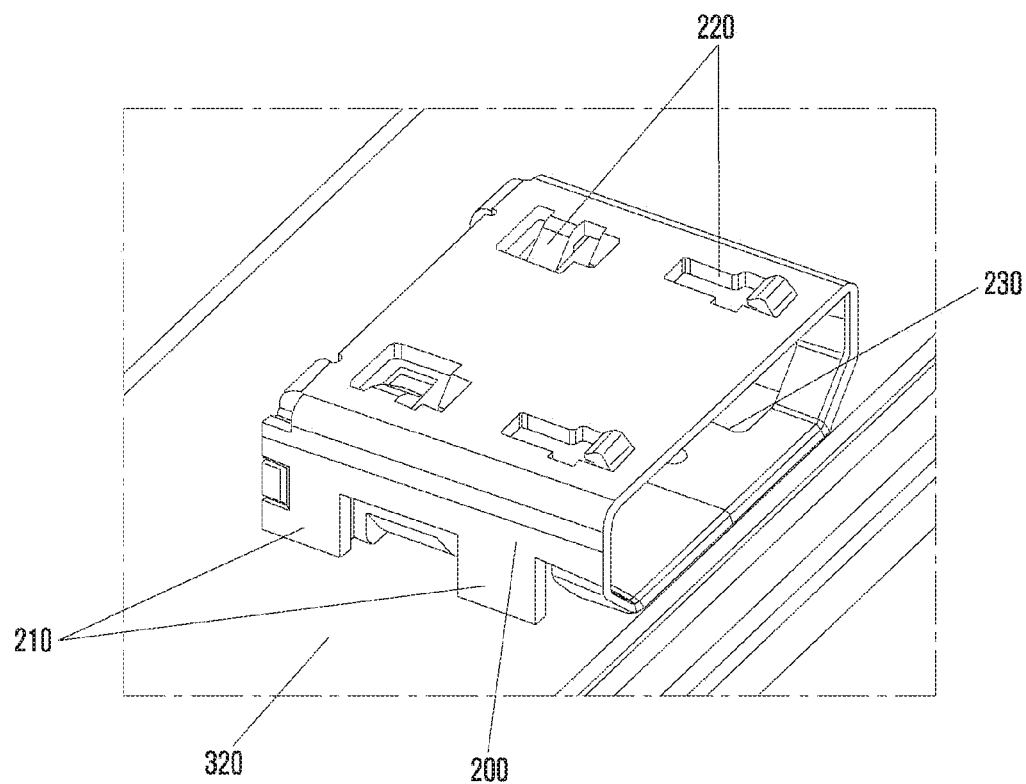
FIG. 2 is a perspective view illustrating an integrated connector according to various embodiments of the present disclosure.

FIG. 2 is a perspective view illustrating an integrated connector according to various embodiments of the present disclosure.

Referring to FIG. 2, according to various embodiments of the present disclosure, an integrated connector 200 may include a lower end fixing portion 210 and a cable binder 220. In order to mount the integrated connector 200 on the PCB 320, the lower end fixing portion 210 may fix the integrated connector 200. The cable binder 220 may strongly bind an external cable that couples to the integrated connector 200. The integrated connector 200 may include a cable connection portion 230 that passes through the external cable.

According to various embodiments of the present disclosure, the integrated connector 200 may require a separate reinforcement structure (e.g., an sus bracket, a rear bracket, a rear case, a battery cover case, and the like) for strongly coupling the integrated connector 200 to the PCB 320 in addition to a basic integrated connector structure. Therefore, when using the integrated connector 200, an entire thickness of an electronic device, such as a mobile terminal may increase.

Figure 3A:
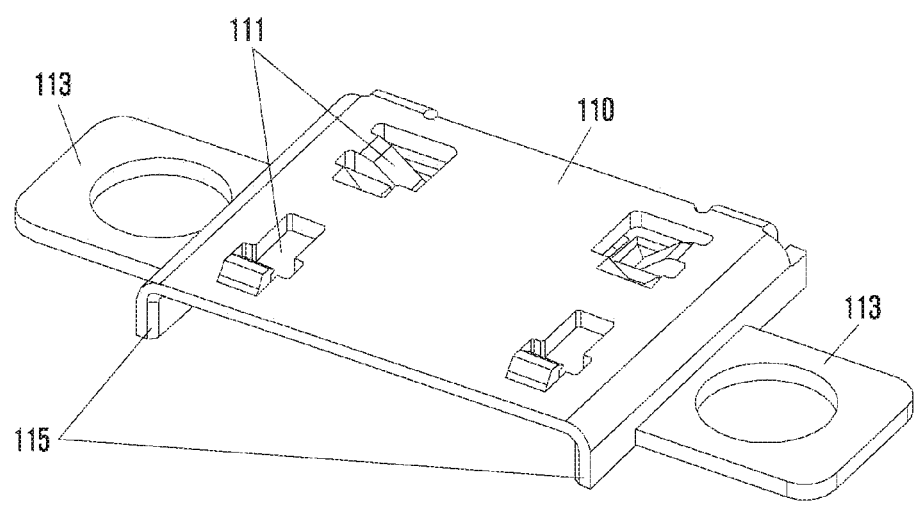
FIG. 3A is a perspective view illustrating a first connector case of a separable connector according to various embodiments of the present disclosure.

FIG. 3A is a perspective view illustrating a first connector case of a separable connector according to various embodiments of the present disclosure.

Referring to FIG. 3A, according to various embodiments of the present disclosure, a first connector case 110 may include a cable binder 111, a fixing hole portion 113, and a connector case coupler 115.

According to various embodiments of the present disclosure, the cable binder 111 may perform a function of binding a cable inserted into the separable connector 100. A protrusion structure (not shown) of the cable may be latched to an empty space of the cable binder 111 and thus the cable may be bound to the separable connector 100.

According to various embodiments of the present disclosure, the fixing hole portion 113 may be formed in a structure protruded to both side surfaces of the first connector case 110. According to various embodiments of the present disclosure, the fixing hole portion 113 may have a hole. For example, a hole of the fixing hole portion 113 may be a screw hole, and by inserting a random structure into the hole, the hole may be used for coupling the first connector case 110 to the case 310 (a rear case or a battery cover case).

According to various embodiments of the present disclosure, the connector case coupler 115 may be located at an edge of the first connector case 110 and may contact with and be coupled to the second connector case 120. The connector case coupler 115 may include various forms of structures for stable contact with and coupling to the second connector case 120. As shown in FIG. 3A, the connector case coupler 115 may contact with and be coupled to the second connector case 120 using a plane structure.

Figure 3B:
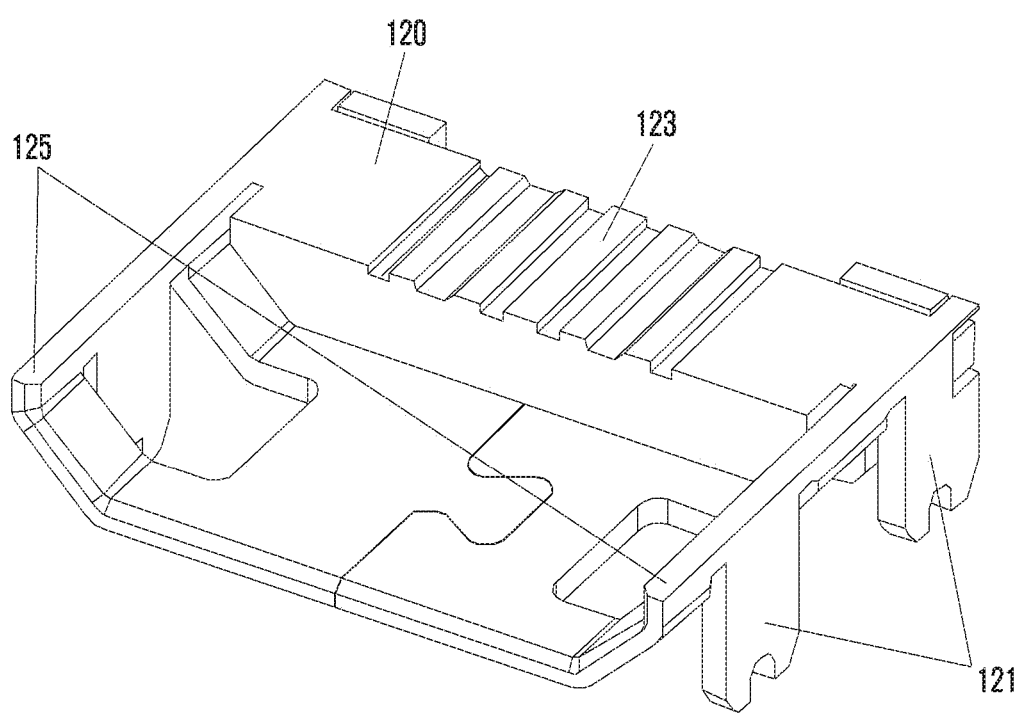
FIG. 3B is a perspective view illustrating a second connector case of a separable connector according to various embodiments of the present disclosure.

FIG. 3B is a perspective view illustrating a second connector case of a separable connector according to various embodiments of the present disclosure.

Referring to FIG. 3B, according to various embodiments of the present disclosure, the second connector case 120 may include a lower end coupler 121, a connector pin coupler 123, and a connector case coupler 125.

According to various embodiments of the present disclosure, the lower end coupler 121 may perform a function of coupling the separable connector 100 to an electronic device (e.g., a PCB or a separate device). According to various embodiments of the present disclosure, the lower end coupler 121 may have a concave groove-shaped structure for stable coupling, and thus the separable connector 100 may be more stably coupled to the electronic device.

According to various embodiments of the present disclosure, the connector pin coupler 123 may have at least one protrusion shape or protrusion and depression structure. The protrusion shape or protrusion and depression structure may correspond to a concave groove or protrusion and depression structure of the connector pin 130 and thus the connector pin 130 may be stably coupled to the separable connector 100.

According to various embodiments of the present disclosure, the connector case coupler 125 may be located at an edge of the second connector case 120 and may contact with and be coupled to the first connector case 110. The connector case coupler 125 may include various forms of structures for stable contact with and coupling to the first connector case 110. As shown in FIG. 3B, the connector case coupler 125 may contact with and be coupled to the first connector case 110 using a plane structure.

Figure 3C:
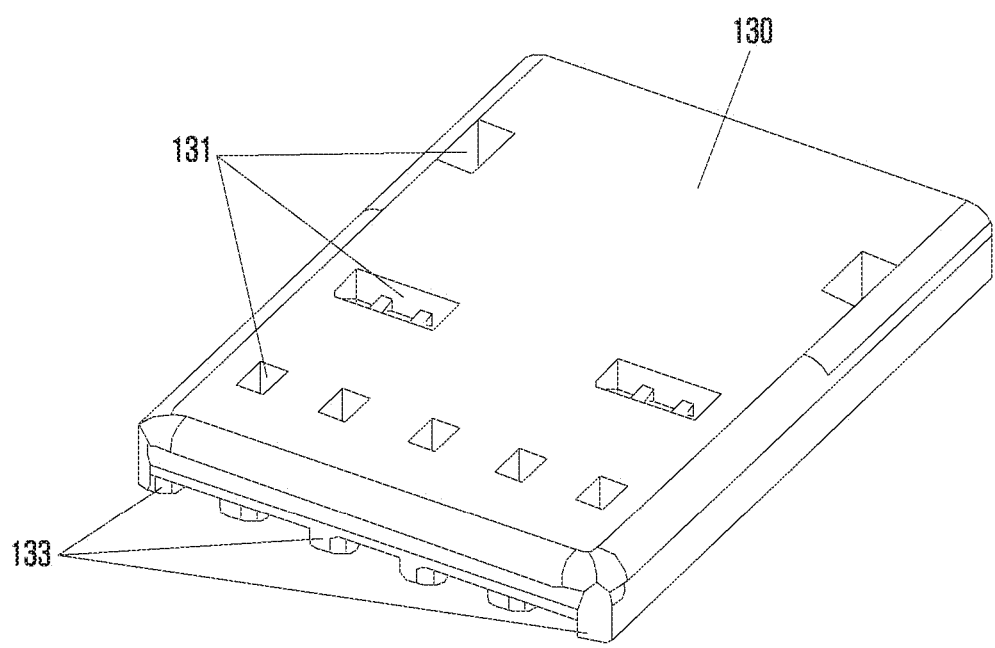
FIG. 3C is a perspective view illustrating a connector pin of a separable connector according to various embodiments of the present disclosure.

FIG. 3C is a perspective view illustrating a connector pin of a separable connector according various embodiments of the present disclosure.

Referring to FIG. 3C, according to various embodiments of the present disclosure, the connector pin 130 may include a coupler 131 and a connection terminal 133.

According to various embodiments of the present disclosure, the coupler 131 may include at least one groove for coupling to a cable or the first connector case 110. A protrusion structure (not shown) of a cable inserted into the connector may be latched to the coupler 131 and thus the cable may be stably bound. Further, a protrusion structure (not shown) of the first connector case 110 may be latched to the coupler 131 and thus the connector pin 130 may be coupled to prevent from being separated from the separable connector 100.

According to various embodiments of the present disclosure, the connection terminal 133 may include at least one protrusion shape or protrusion and depression structure. The protrusion shape or protrusion and depression structure may correspond to a concave groove or protrusion and depression structure of an inserted cable and thus the connector pin 130 and the cable may be stably coupled.

According to various embodiments of the present disclosure, the connection terminal 133 is electrically connected to a connection terminal of the cable to perform a data transmission and a reception function (e.g., a music reproduction, a file movement, and the like) of an electronic device.

Figure 3D:
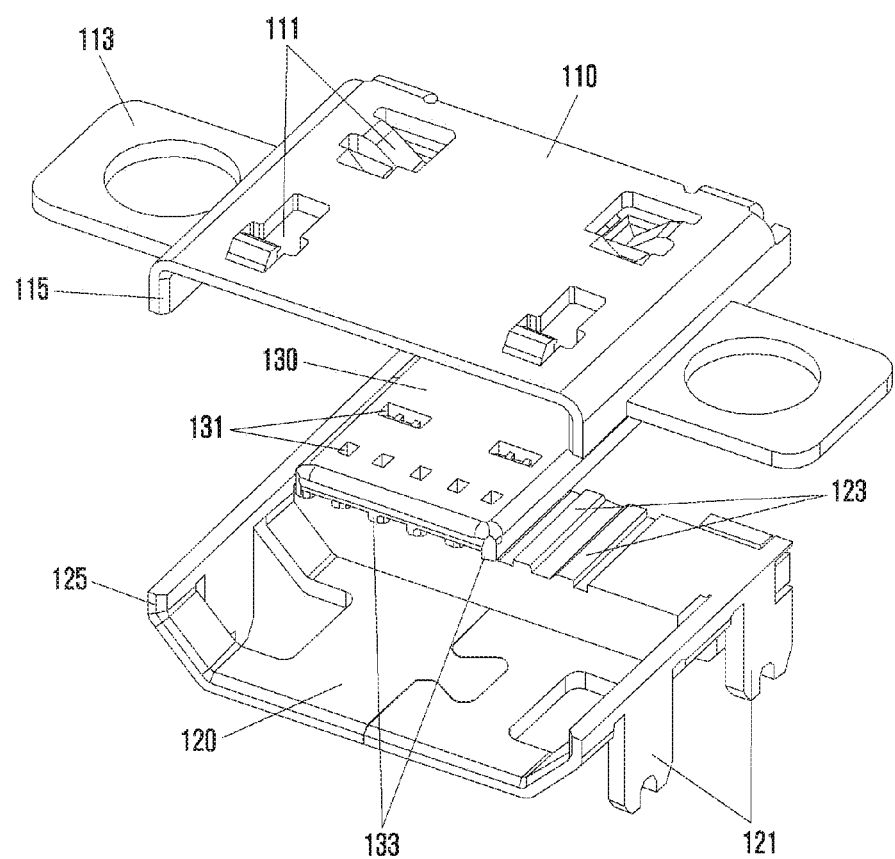
FIG. 3D is a perspective view illustrating a coupling location of a first connector case, a second connector case, and a connector pin of a separable connector according to various embodiments of the present disclosure.

FIG. 3D is a perspective view illustrating a coupling location of a first connector case, a second connector case, and a connector pin of a separable connector according to various embodiments of the present disclosure.

Referring to FIG. 3D, according to various embodiments of the present disclosure, the connector pin 130 may be located under the first connector case 110, and the second connector case 120 may be located under the connector pin 130. The first connector case 110, the second connector case 120, and the connector pin 130 may be coupled to form the separable connector 100. When the separable connector 100 is separated from an electronic device, the coupled connector pin 130 may be separated from the first connector case 110 and may be separated from the second connector case 120.

Figure 4A:
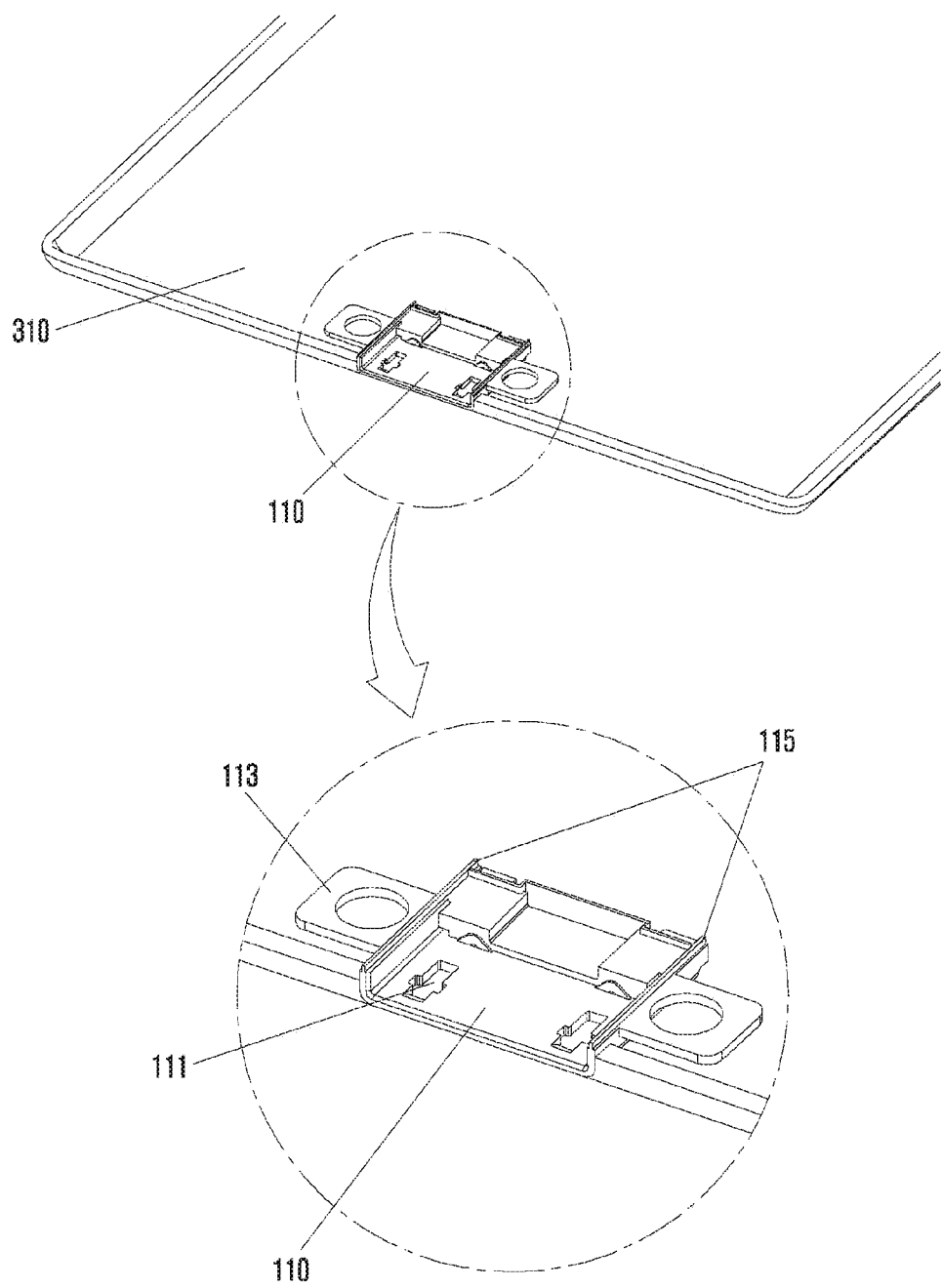
FIG. 4A is a perspective view illustrating coupling of a first connector case and a battery case of a separable connector according to various embodiments of the present disclosure.

FIG. 4A is a perspective view illustrating coupling of a first connector case and a battery case of a separable connector according to various embodiments of the present disclosure.

Referring to FIG. 4A, according to various embodiments of the present disclosure, the first connector case 110 may be coupled to the case 310 and may be separated from the separable connector 100. For example, the case 310 may be a battery cover case.

According to various embodiments of the present disclosure, the first connector case 110 may be coupled to the battery cover case 310 using the fixing hole portion 113. For example, a hole of the fixing hole portion 113 may be a screw hole, and by inserting a random structure into the hole, the hole may be used for coupling the first connector case 110 to the battery cover case 310.

Figure 4B:
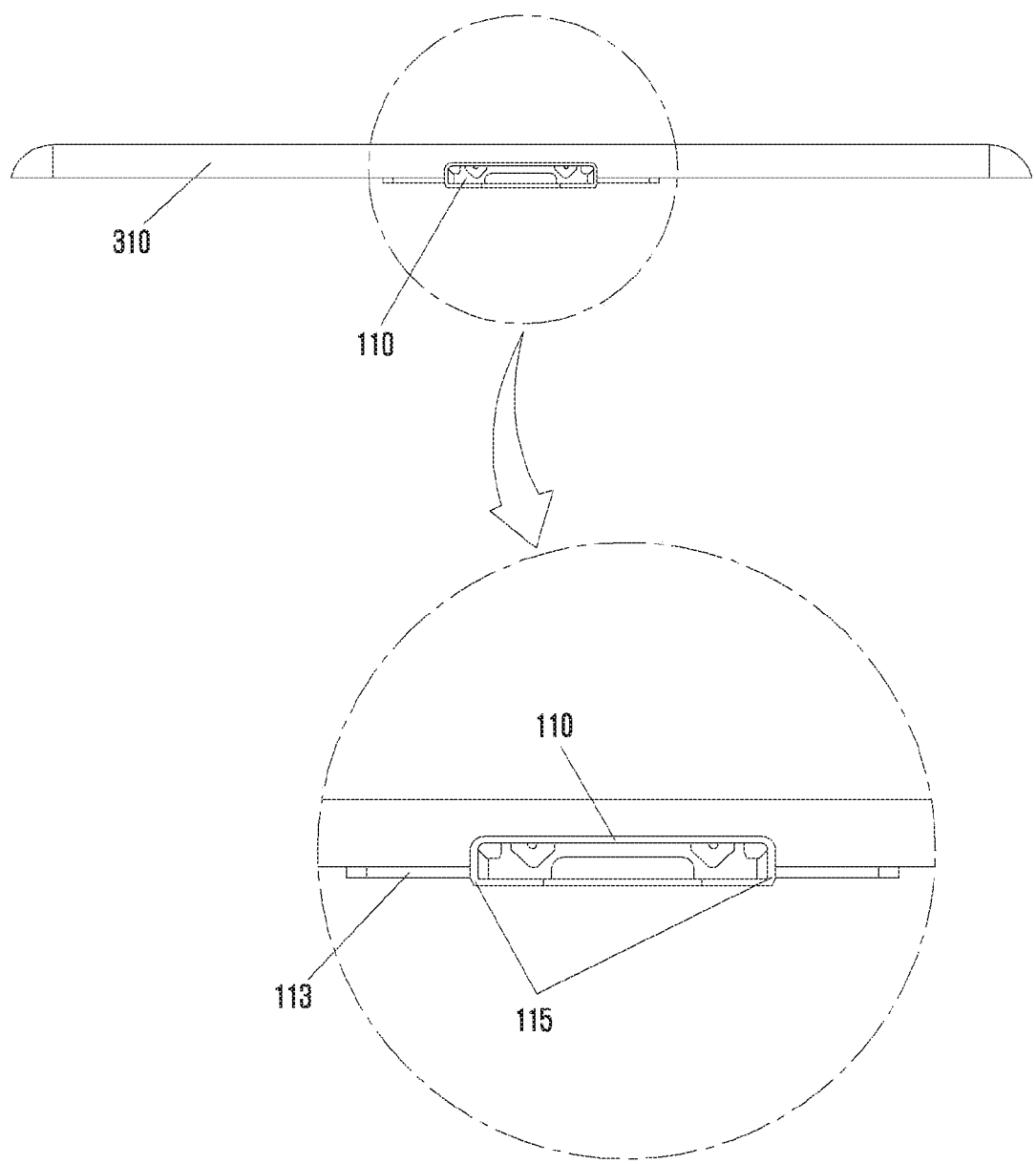
FIG. 4B is a side view illustrating coupling of a first connector case and a battery case of a separable connector according to various embodiments of the present disclosure.

FIG. 4B is a side view illustrating coupling of a first connector case and a battery case of a separable connector according to various embodiments of the present disclosure.

Referring to FIG. 4B, according to various embodiments of the present disclosure, the first connector case 110 may be coupled to the case 310 and may be separated from the separable connector 100. For example, the case 310 may be a battery cover case. For example, the first connector case 110 may be a partial structure of the battery cover case 310 and may be depressed and located at the inside of the battery cover case 310. Therefore, in an electronic device, such as a mobile terminal, because a reinforcement structure (e.g., an sus bracket, a rear bracket, a rear case, and the like) for covering the connector may be omitted, an entire thickness of the electronic device can be reduced. FIG. 4B illustrates a structure in which the fixing hole portion 113 and the connector case coupler 115 of the first connector case 110 are protruded from the battery cover case 310, but in addition to such a structure, the fixing hole portion 113 and the connector case coupler 115 of the first connector case 110 are completely depressed into the battery cover case 310 to entirely form a flat-shaped structure.

Figure 5A:
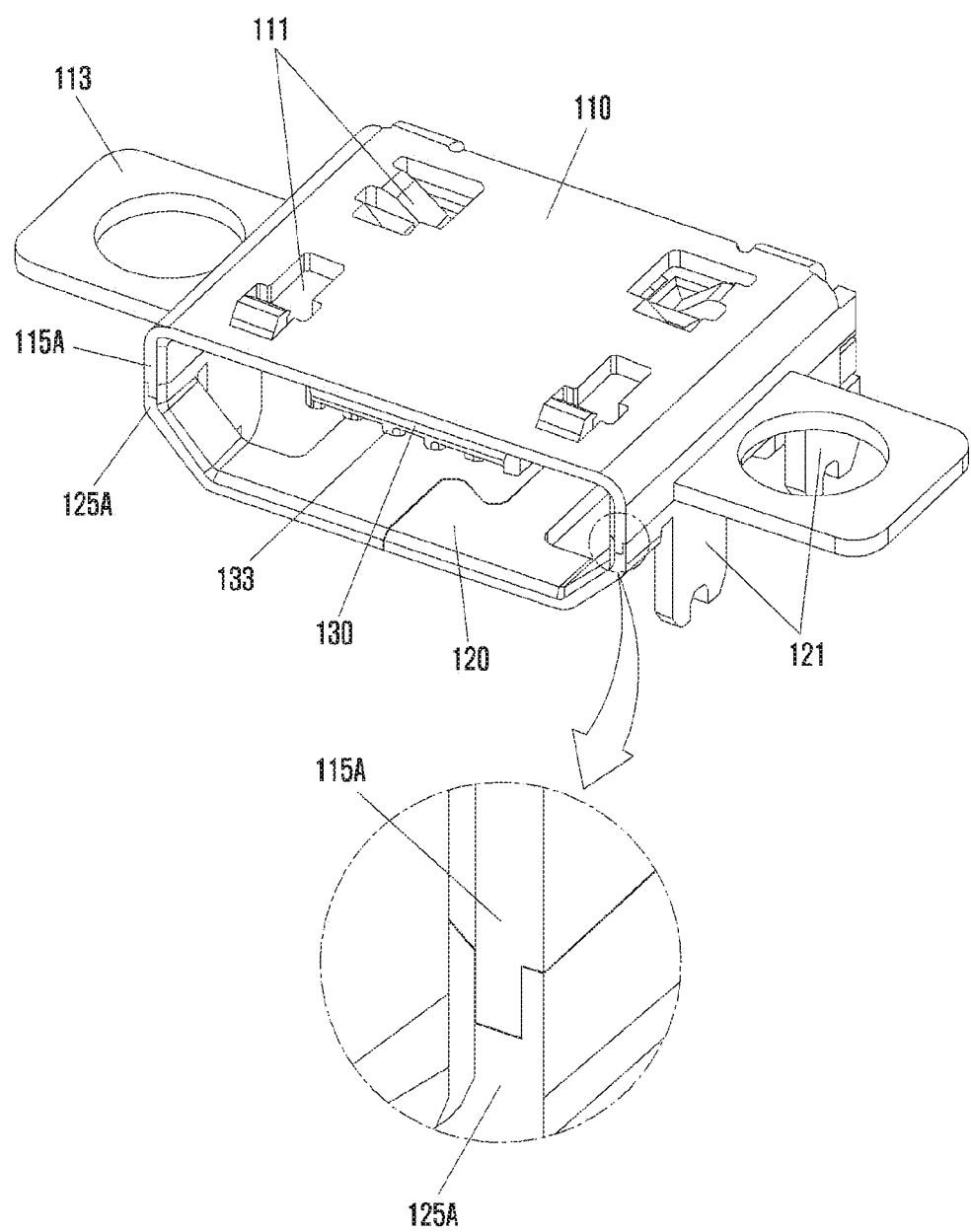
FIG. 5A is a perspective view illustrating a separable connector including a first protrusion and depression structure according to various embodiments of the present disclosure.
Figure 5B:
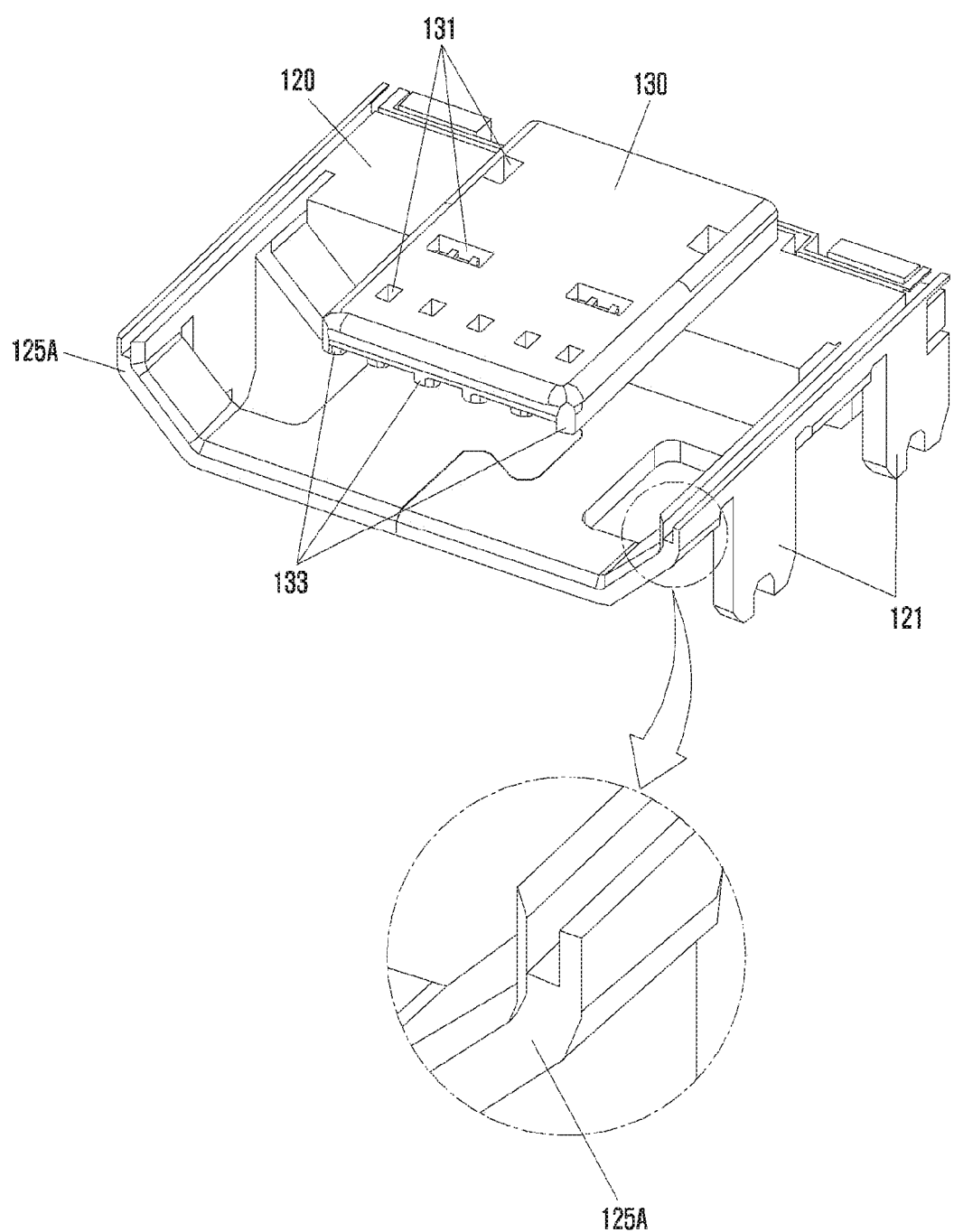
FIG. 5B is a perspective view illustrating a second connector case corresponding to a first protrusion and depression structure according to various embodiments of the present disclosure.
Figure 5C:
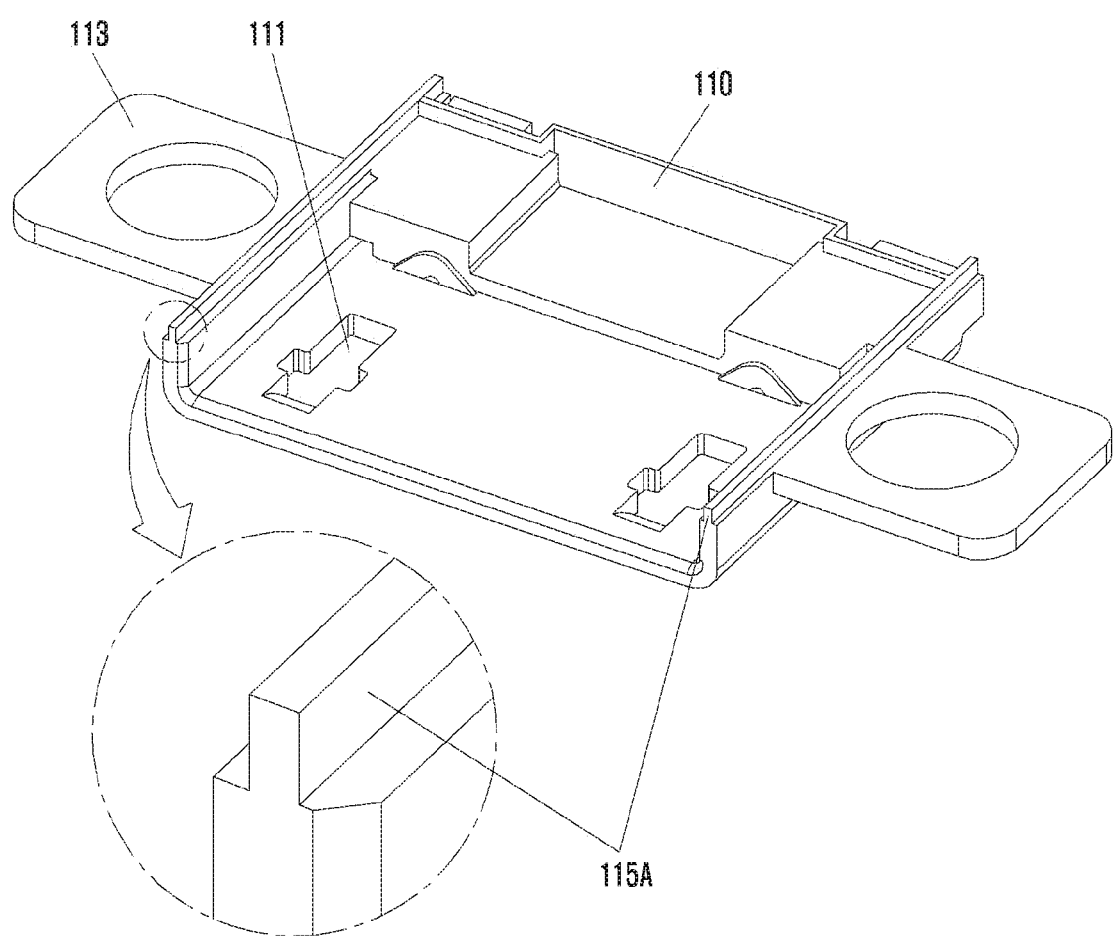
FIG. 5C is a perspective view illustrating a first connector case corresponding to a first protrusion and depression structure according to various embodiments of the present disclosure.

FIGS. 5A to 5C are perspective views illustrating a separable connector including a first protrusion and depression structure according to various embodiments of the present disclosure.

FIG. 5A is a perspective view illustrating a separable connector including a first protrusion and depression structure according to various embodiments of the present disclosure, FIG. 5B is a perspective view illustrating a second connector case corresponding to a first protrusion and depression structure according to various embodiments of the present disclosure, and FIG. 5C is a perspective view illustrating a first connector case corresponding to a first protrusion and depression structure according to various embodiments of the present disclosure.

Referring to FIGS. 5A to 5C, according to various embodiments of the present disclosure, the separable connector 100 may include first protrusion and depression structures 115A and 125A. For example, the connector case coupler 115 of the first connector case 110 may include a pillar-shaped structure protruded downward, and the connector case coupler 125 of the second connector case 120 may include a concave groove corresponding to the connector case coupler 115. For example, the first connector case 110 and the second connector case 120 may contact and couple using the first protrusion and depression structures 115A and 125A.

Figure 5D:
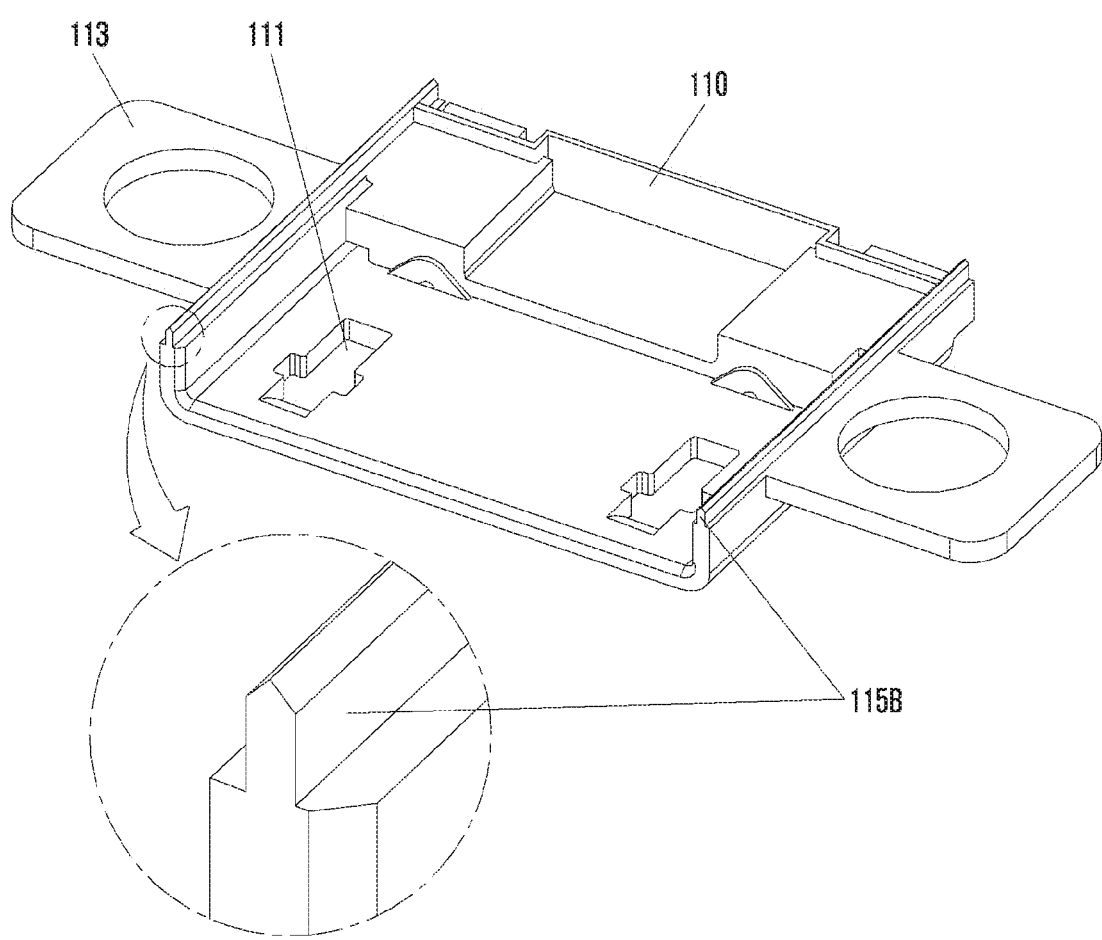
FIG. 5D is a perspective view illustrating a first connector case corresponding to a second protrusion and depression structure according to various embodiments of the present disclosure.

FIG. 5D is a perspective view illustrating a first connector case corresponding to a second protrusion and depression structure according to various embodiments of the present disclosure.

Referring to FIG. 5D, according to various embodiments of the present disclosure, the separable connector 100 may include a second protrusion and depression structure 115B. For example, the connector case coupler 115 of the first connector case 110 may include a pointed-shaped structure protruded downward, and a connector case coupler (not shown) of the second connector case 120 may include a pointed groove corresponding to the connector case coupler 115. For example, the first connector case 110 and the second connector case 120 may contact and couple using the second protrusion and depression structure 115B.

Referring to FIGS. 5A to 5D, according to various embodiments of the present disclosure, the separable connector 100 may include first protrusion and depression structures 115A and 125A or a second protrusion and depression structure 115B. Due to the protrusion and depression structure, an assembling ability of the separable connector 100 can be reinforced and a waterproof function can be provided.

Figure 6A:
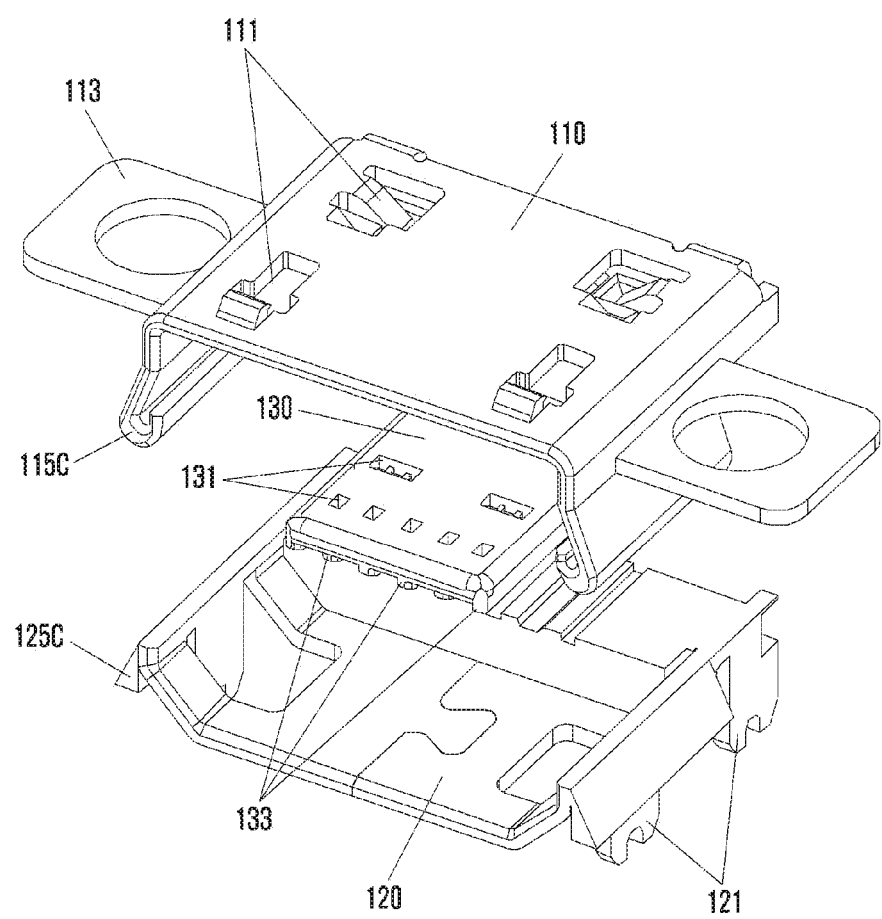
FIG. 6A is a perspective view illustrating a separable connector including a latch structure in a first direction according to various embodiments of the present disclosure.
Figure 6B:
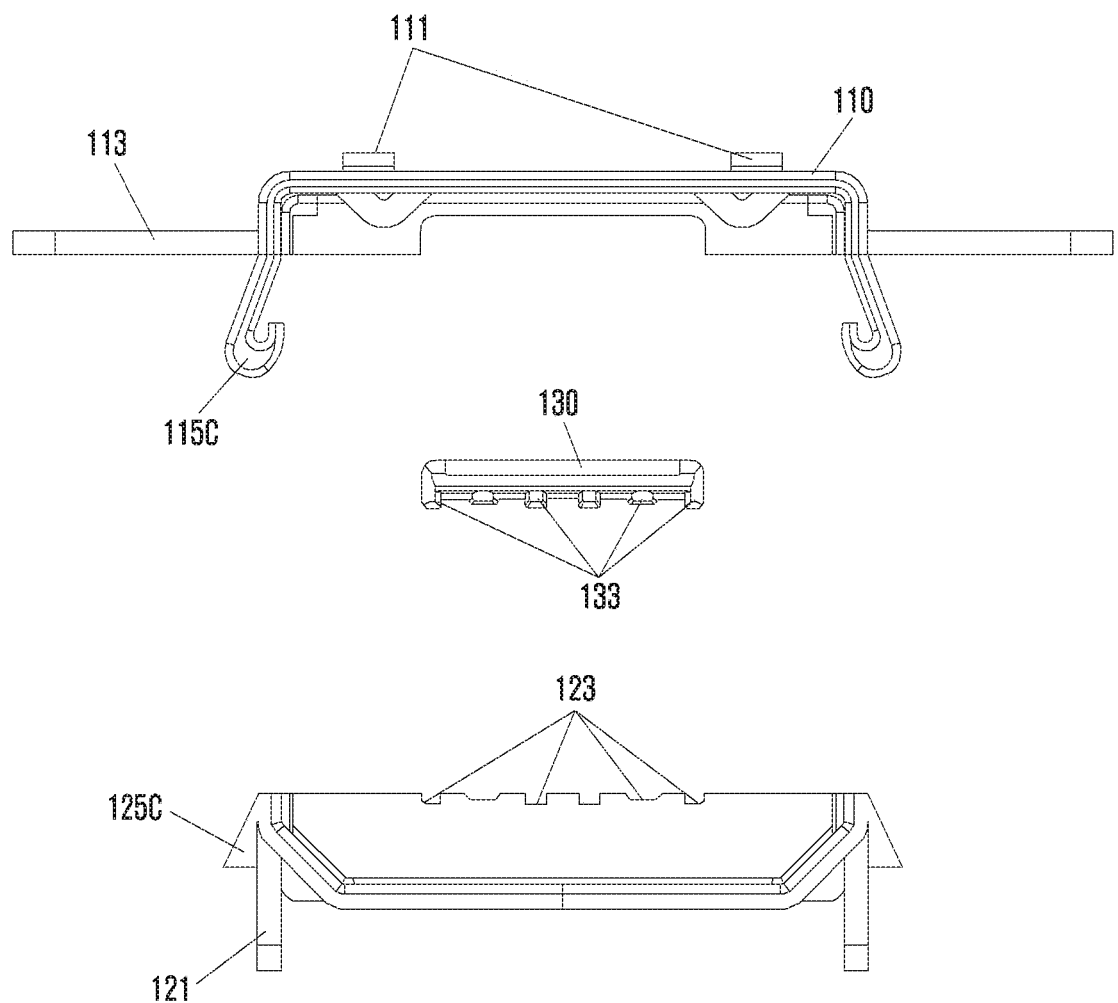
FIG. 6B is a side view illustrating a separable connector including a latch structure according to various embodiments of the present disclosure.
Figure 6C:
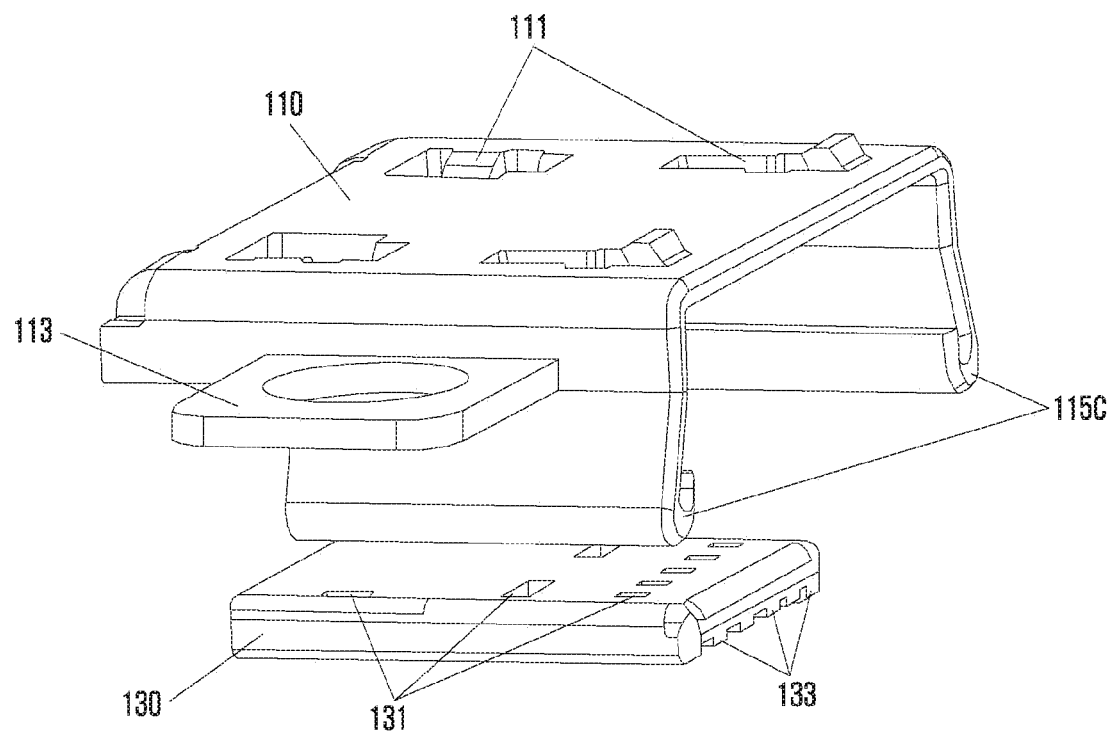
FIG. 6C is a perspective view illustrating a separable connector including a latch structure in a second direction according to various embodiments of the present disclosure.
Figure 6C:
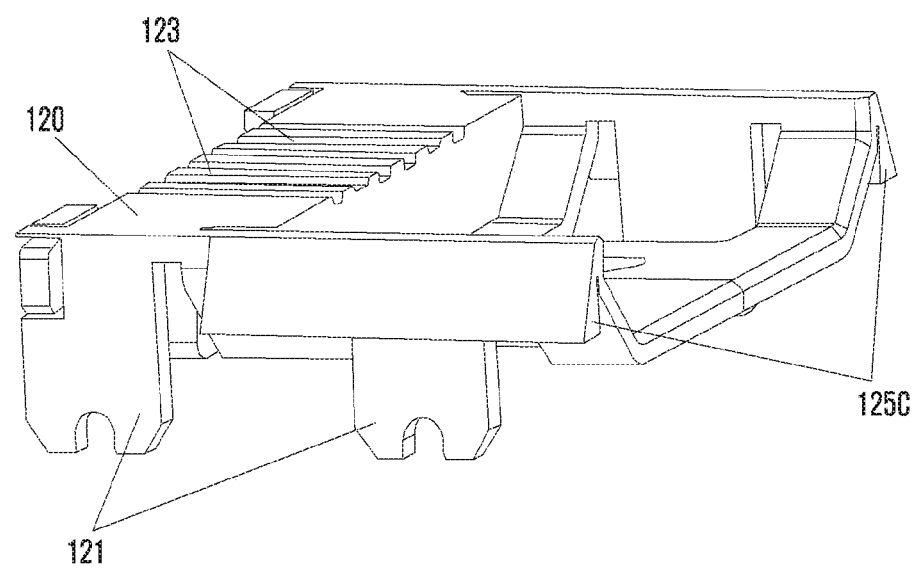

FIGS. 6A to 6C are perspective views illustrating a separable connector including a latch structure according to various embodiments of the present disclosure.

FIG. 6A is a perspective view illustrating a separable connector including a latch structure in a first direction according to various embodiments of the present disclosure, FIG. 6B is a side view illustrating a separable connector including a latch structure according to various embodiments of the present disclosure, and FIG. 6C is a perspective view illustrating a separable connector including a latch structure in a second direction according to various embodiments of the present disclosure.

Referring to FIGS. 6A to 6C, according to various embodiments of the present disclosure, the separable connector 100 may include latch structures 115C and 125C. For example, the connector case coupler 115 of the first connector case 110 may include a hook-shaped structure protruded downward, and the connector case coupler 125 of the second connector case 120 may include a structure protruded to a side surface so as to fasten a hook of the connector case coupler 115.

According to various embodiments of the present disclosure, the connector case coupler 125 may have a slope structure to correspond to the connector case coupler 115. For example, the connector case coupler 115 may use an elastic material and may slip and be fastened to a slope of the connector case coupler 125.

According to various embodiments of the present disclosure, in order to separate the first connector case 110 and the second connector case 120, a sliding method may be used. For example, because the separable connector 100 may include latch structures 115C and 125C, when applying a force in a vertical direction of a direction in which the PCB 320 is put, the latch structures 115C and 125C may be damaged. Therefore, by separating the second connector case 120 from the first connector case 110 by applying a force in a horizontal direction of a direction in which the PCB 320 is put, the first connector case 110 may be used without damage of the latch structures 115C and 125C.

According to various embodiments of the present disclosure, the separable connector 100 may include first protrusion and depression structures 115A and 125A, a second protrusion and depression structure 115B, and latch structures 115C and 125C, and the separable connector 100 is not limited thereto. For example, a housing of the separable connector 100 may be separated in a vertical direction of a direction in which the PCB 320 is put instead of being separated in a horizontal direction of a direction in which the PCB 320 is put. For example, by vertically penetrating the separable connector 100, a portion thereof may be coupled to the case 310 and the remaining portions thereof may be coupled to the PCB 320.

According to various embodiments of the present disclosure, a housing of the separable connector 100 may have a structure formed with two pieces, but it is not limited thereto. The separable connector 100 may be formed with at least two pieces according to preference and product completeness of a production company, and at least one piece of the at least two pieces is attached to the external device 300 to form an integrated structure. Here, implementation of an integrated structure may mean double injection, single material implement, and bonding.

Figure 7A:
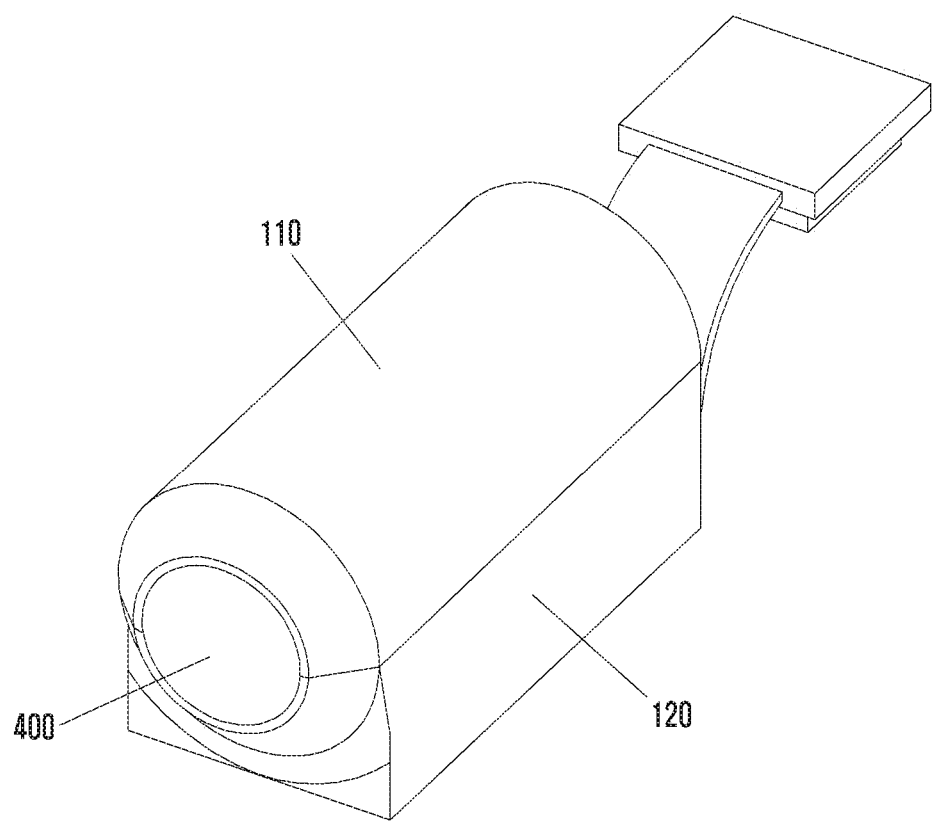
FIG. 7A is a perspective view illustrating a coupled shape of a separable connector according to various embodiments of the present disclosure.
Figure 7B:
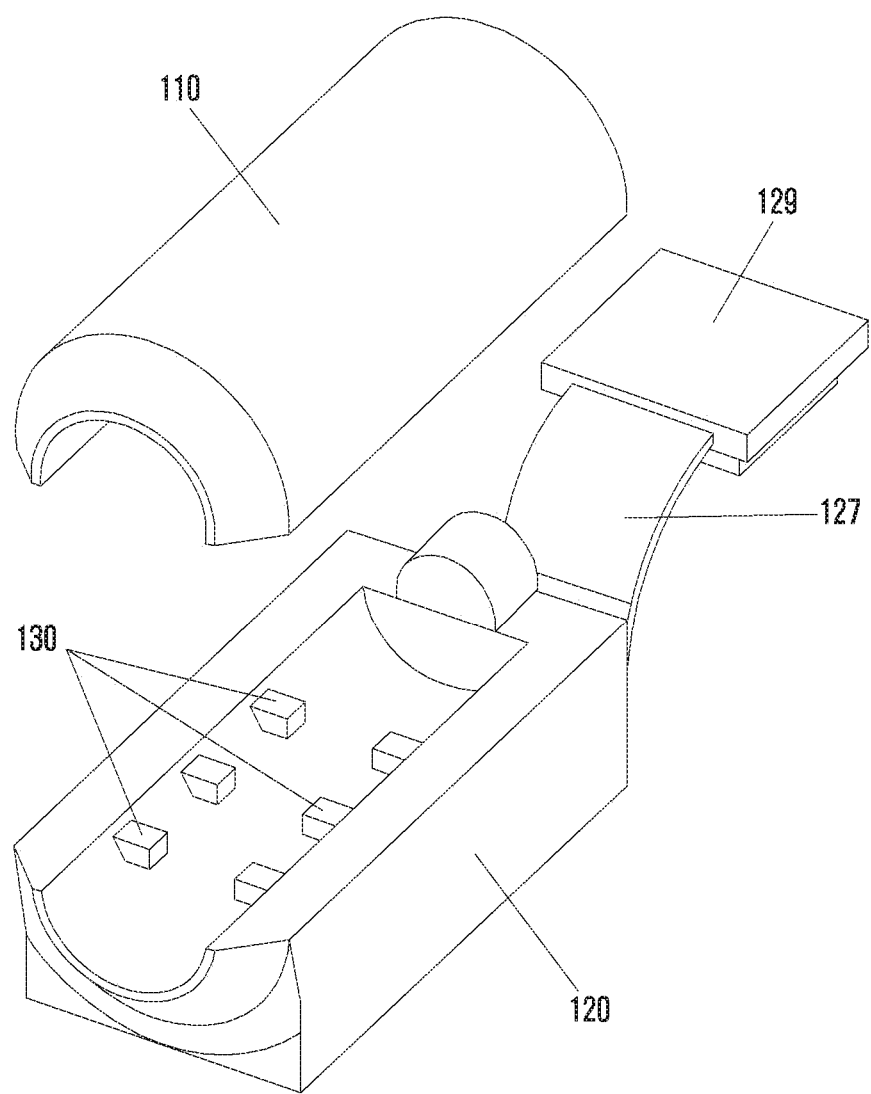
FIG. 7B is a perspective view illustrating a separate shape of a separable connector according to various embodiments of the present disclosure.

FIGS. 7A and 7B are perspective views illustrating a coupled shape and a separate shape of a separable connector according to various embodiments of the present disclosure.

Referring to FIGS. 7A and 7B, according to various embodiments of the present disclosure, the separable connector 100 may include an earjack as well as a universal serial bus (USB) type connector.

According to various embodiments of the present disclosure, the separable connector 100 may include a first connector case 110 and a second connector case 120. For example, the separable connector 100 is coupled to the first connector case 110 and the second connector case 120 to form a hole 400 into which a terminal of an earphone may be inserted.

According to various embodiments of the present disclosure, the first connector case 110 is coupled to the case 310 to form an integrated structure. For example, the first connector case 110 and the case 310 forming an external appearance of the separable connector 100 are coupled to form an integrated structure. In addition to a thickness of a basic connector structure, an entire thickness thereof may generally increase because of an additional reinforcement structure (e.g., an sus bracket, a rear bracket, and the like) for strongly coupling the separable connector 100.

According to various embodiments of the present disclosure, as a portion of the separable connector 100 strongly couples to the case 310, some of reinforcement structures (e.g., an sus bracket, a rear bracket, and the like) may be reduced. Thereby, an entire thickness of an electronic device, such as a mobile terminal, can be reduced, and a production company can produce a slimmer product.

According to various embodiments of the present disclosure, the second connector case 120 is coupled to the PCB 320 to form an integrated structure. For example, the PCB 320 and the second connector case 120 forming an external appearance of the separable connector 100 are coupled to form an integrated structure. For example, a portion of the second connector case 120 may be mounted on the PCB 320 and thus the separable connector 100 and the electronic device can be strongly coupled.

According to various embodiments of the present disclosure, the second connector case 120 may include another structure in addition to a structure mounted on the PCB 320 of the electronic device. For example, the second connector case 120 may include a sub PCB, and the connector pin 130, a flexible printed circuit (FPC) 127, and a connector connection portion 129 may be coupled to the sub PCB. When the second connector case 120 has a structure mounted on the PCB 320 of the electronic device, the FPC 127 and the connector connection portion 129 may be excluded.

According to various embodiments of the present disclosure, the connector pin 130 is coupled to an external connection terminal to perform a data transmission and reception function (e.g., a music reproduction). In order to perform more stable data transmission and reception, the connector pin 130 may include a structure (e.g., protrusions and depressions) for coupling the external connection terminal.

According to various embodiments of the present disclosure, the connector pin 130 may include a connector line including a rotation shaft or a flexible cable for transferring an electrical signal for a data input and output. The flexible cable or the connector line may be mounted on the PCB 320 of the electronic device by soldering and may be used for data transmission and reception between the external cable and the electronic device.

According to various embodiments of the present disclosure, the connector pin 130 may include a connector line including a rotation shaft or a flexible cable for transferring an electrical signal for a data input and output. The flexible cable or the connector line may be mounted by soldering on the sub PCB provided in the earjack and may be used for data transmission and reception between the external cable and the electronic device.

According to various embodiments of the present disclosure, in the separable connector 100, the first connector case 110 and the second connector case 120 may contact and be coupled using a flat surface, however a contact and coupling of the first connector case 110 and the second connector case 120 are not limited thereto. For example, the first connector case 110 and the second connector case 120 may contact and be coupled using a protrusion and depression structure (e.g., a quadrangular pillar shape, a pointed pillar shape, and the like). Further, a housing of the separable connector 100 may be separated in a vertical direction of a direction in which the PCB 320 is put instead of being separated in a horizontal direction of a direction in which the PCB 320 is put. For example, by vertically and partially penetrating the separable connector 100, a portion thereof may be coupled to the case 310 and the remaining portions thereof may be coupled to the PCB 320.

According to various embodiments of the present disclosure, a housing of the separable connector 100 may include a structure formed with two pieces, however the housing of the separable connector 100 is not limited thereto. The separable connector 100 may be formed with at least two pieces according to preference and product completeness of a production company, and at least one piece of the at least two pieces may be attached to the external device 300 to implement an integrated structure. Here, implementation of an integrated structure may mean double injection, single material implement, and bonding.

A connector formed with at least two housings according to various embodiments disclosed in this specification includes a first connector case, and a second connector case, wherein at least one of the first connector case or the second connector case is coupled to an external device to form an integrated structure.

The external device may include a case (e.g., a battery cover case) constituting an external appearance of an electronic device.

The external device may include a case (e.g., a rear case) for fixing at least one component constituting the inside of an electronic device.

The integrated structure may be formed using double injection, single material forming, or bonding.

The separable connector may further include a connector pin, wherein the connector pin may be coupled to the first connector case or the second connector case to be separated together, when the first connector case and the second connector case are separated.

The first connector case may include a fixing hole portion, and the fixing hole portion and the external device may be coupled to form an integrated structure.

The integrated structure may be formed by inserting a fixing nail into a hole of the fixing hole portion.

The fixing nail may be a screw.

The first connector case and the second connector case may include a connector case coupler, and the first connector case and the second connector case may be coupled using the connector case coupler.

In the connector case coupler, a coupling surface of the first connector case and the second connector case may form a flat surface.

In the connector case coupler, a coupling surface of the first connector case and the second connector case may form a protrusion and depression structure.

The protrusion and depression structure may include a quadrangular pillar-shaped protrusion structure and a quadrangular groove structure corresponding to the quadrangular pillar shape.

The protrusion and depression structure may include a triangular pillar-shaped protrusion structure and a triangular groove structure corresponding to the triangular pillar shape.

The connector case coupler may form a latch structure.

The latch structure may include a hook portion in the first connector case and include a hook coupling and mounting portion in the second connector case.

The hook coupling and mounting portion may include a slope, and the hook portion may be made of an elastic material to be coupled and mounted to slip along a slope of the hook coupling and mounting portion.

The latch structure may be separated by sliding the hook portion in a horizontal direction of a PCB in which the second connector case is mounted.

As described above, according to various embodiments disclosed in this specification, by improving a structure of a connector mounted in an electronic device, such as a mobile terminal, an entire thickness of the electronic device can be reduced. More particularly, the connector can be separated into several portions, and as a portion of the separated connector is coupled to a separate device, an entire thickness of the electronic device can be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A separable connector of an electronic device, the separable connector comprising:
   a first connector case;
   a second connector case; and
   a connector pin configured to connect to at least one of the first connector case and the second connector case,
   wherein the first connector case and the second case are configured to detachably combine together and form a housing for the connector pin,
   wherein at least one of the first connector case and the second connector case is configured to be coupled to a detachable battery cover configured to cover an open back side of the electronic device into which a battery is installed, to form an integrated structure of the electronic device,
   wherein the first connector case and the second connector case are separated when the detachable battery cover is detached from the electronic device, and
   wherein the connector pin is configured to detachably connect to an external device.

2. The separable connector of claim 1, wherein the integrated structure is formed using double injection, single material forming, or bonding.

3. The separable connector of claim 1, wherein, when the first connector case and the second connector case are separated, the connector pin remains coupled to either the first connector case or the second connector case.

4. The separable connector of claim 1,
   wherein the first connector case comprises a fixing hole portion, and
   wherein the fixing hole portion and the detachable battery cover are coupled to form the integrated structure.

5. The separable connector of claim 4, wherein the integrated structure is formed by inserting a fixing nail into a hole of the fixing hole portion.

6. The separable connector of claim 5, wherein the fixing nail comprises a screw.

7. The separable connector of claim 1,
   wherein the first connector case and the second connector case comprise a connector case coupler, and
   wherein the first connector case and the second connector case are coupled using the connector case coupler.

8. The separable connector of claim 7,
   wherein the first connector case comprises a coupling surface, and
   wherein, in the connector case coupler, the coupling surface of the first connector case and the second connector case forms a flat surface.

9. The separable connector of claim 7,
   wherein the first connector case comprises a coupling surface, and
   wherein, in the connector case coupler, the coupling surface of the first connector case and the second connector case forms a protrusion and depression structure.

10. The separable connector of claim 9, wherein the protrusion and depression structure comprises a quadrangular pillar-shaped protrusion structure and a quadrangular groove structure corresponding to the quadrangular pillar-shaped protrusion structure.

11. The separable connector of claim 9, wherein the protrusion and depression structure comprises a triangular pillar-shaped protrusion structure and a triangular groove structure corresponding to the triangular pillar-shaped protrusion structure.

12. The separable connector of claim 7, wherein the connector case coupler forms a latch structure.

13. The separable connector of claim 12, wherein the latch structure comprises:
    a hook portion in the first connector case, and
    a hook coupling and mounting portion in the second connector case.

14. The separable connector of claim 13,
    wherein the hook coupling and mounting portion comprises a slope,
    wherein the hook portion comprises an elastic material, and
    wherein the hook portion is configured to be coupled and mounted to slip along the slope of the hook coupling and mounting portion.

15. The separable connector of claim 13, wherein the latch structure is separated by sliding the hook portion in a horizontal direction of a printed circuit board (PCB) in which the second connector case is mounted.

16. The separable connector of claim 7,
    wherein the connector case coupler of the first connector case comprises a pillar-shaped structure protruded in a downward direction, and
    wherein the connector case coupler of the second connector case comprises a concave groove corresponding to the connector case coupler.

* * * * *